Figure 1:
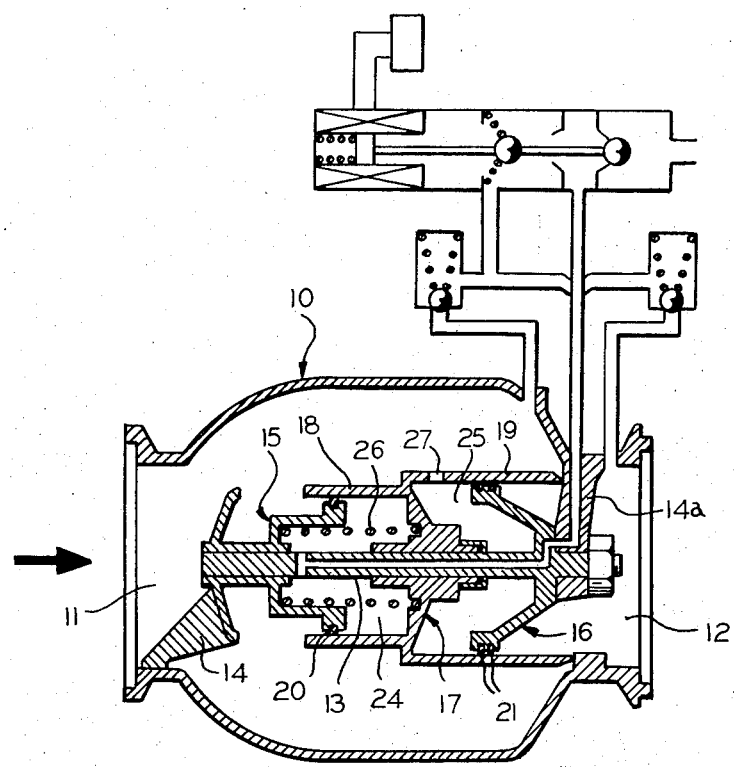

United States Patent [19]

Salerno et al.

[11] 3,825,026

[45] July 23, 1974

[54] INLINE VALVE

[75] Inventors: Paul G. Salerno, Glenview; John Sikorcin, Elmhurst; Richard Wm. Piecuch, Morton Grove, all of Ill.

[73] Assignee: Vapor Corporation, Chicago, Ill.

[22] Filed: June 1, 1973

[21] Appl. No.: 366,259

[52] U.S. Cl. .................. 137/219, 251/30, 251/31
[51] Int. Cl. .......................................... F16k 31/42
[58] Field of Search ........ 137/219, 221, 492.5, 488; 251/25, 30, 31, 43, 44

[56] References Cited
UNITED STATES PATENTS
2,085,893  7/1937  Boland ............................. 137/219

| | | | |
|---|---|---|---|
| 2,480,712 | 8/1949 | Carbon | 251/44 X |
| 3,092,132 | 6/1963 | Guy et al. | 137/219 |
| 3,198,204 | 8/1965 | Parks | 137/219 |
| 3,297,047 | 1/1967 | Sime | 137/220 |
| 3,792,713 | 2/1974 | Zadoo | 137/220 X |

FOREIGN PATENTS OR APPLICATIONS
421,632  5/1947  Italy ................................. 137/219

*Primary Examiner*—William R. Cline
*Assistant Examiner*—Gerald A. Michalsky
*Attorney, Agent, or Firm*—Lloyd L. Zickert

[57] ABSTRACT

A valve for inline duct work including a pilot valve for controlling operation of the valve, together with pilot circuitry which enables the valve to be closed on command in the event of a duct pressure reversal.

2 Claims, 2 Drawing Figures

PATENTED JUL 23 1974 3,825,026

INLINE VALVE

This invention relates in general to an inline valve, and more particularly to a sleeve valve which is operable during normal air flow conditions between open and closed position on command and which will operate upon command to close in the event of duct reversal pressure.

Heretofore it has been known to provide unidirectional axial flow air valves of the inline type. However, it has not been known to provide an axial inline valve capable of being closed on command in the event of duct pressure reversal.

It is therefore an object of the present invention to provide an axial flow air valve capable of being closed on command in the event duct pressure reversal occurs.

Figure 2:
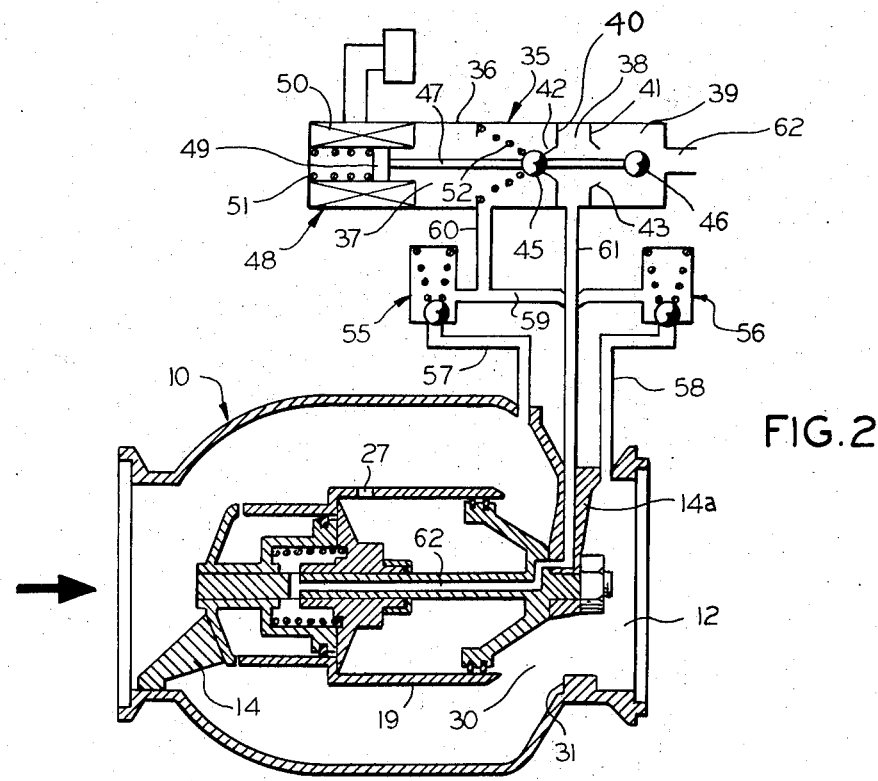

Other objects, features and advantages of the invention will be apparent from the following detailed disclosure, taken in conjunction with the accompanying sheet of drawings, wherein like reference numerals refer to like parts, in which:

FIG. 1 is a schematic view of the valve according to the present invention shown in closed condition; and FIG. 2 is a schematic view of the valve as shown in FIG. 1 but showing the valve in open position and with the parts respectively moved so that the valve will be in open position.

Referring now to the drawings, the valve according to the invention includes a valve body 10 which is tubular in shape and includes an inlet 11 and an outlet 12. An axially extending guide rod 13 is suitably supported within the valve body between the inlet and outlet by spider supports 14 and 14a. First and second generally annularly shaped walls 15 and 16 are integral with the guide rod 13 and at the opposite ends thereof. A piston member 17 is mounted for sliding movement along the guide rod 13 and has extending therefrom in one direction a first sleeve 18 that coacts with the wall 15 and a second sleeve 19 that coacts with the wall 16. Suitable sealing rings 20 and 21 are mounted on the peripheries of the walls 15 and 16 to provide sealing engagement between the peripheries of the walls and the sleeve 18 and 19. Accordingly, the wall 15 coacts with the piston member 17 and the sleeve 18 to define a first pressure chamber 24, while the wall 16 coacts with the piston member 17 and the sleeve 19 to define a second pressure chamber 25. A piston return spring 26 is provided in the chamber 24 bottoming at one end on the wall 15 and at the other end on the piston member 17 to continually bias the piston member and sleeve assembly toward the outlet 12. Accordingly, in the event that no pressures are registering in the chambers, the spring member will cause the valve to move to closed position. A pressure port 27 is formed in the sleeve 19 thereby placing the pressure chamber 25 in communication with the air flow in the valve ahead of the outlet 12 and which is considered the inlet pressure.

The piston member and sleeve assembly define with the interior of the valve body an air channel annular in shape through which air flows between the inlet and outlet when the valve is open. Additionally, as seen in FIG. 2, when the valve is open, an opening 30 is defined between a seat 31 formed adjacent the outlet 12 and the leading edge of the sleeve 19. The opening will be closed when the sleeve and piston assembly is in the position as shown in FIG. 1 wherein the sleeve 19 bears against the seat 31.

The valve is open and closed by means of a pilot valve 35 which includes a casing 36 divided into chambers 37, 38 and 39 by partitions 40 and 41. A port 42 is defined in the partition 40 and a port 43 is defined in the partition 41. Poppets 45 and 46 coact with the ports 42 and 43 respectively and are mounted on a control rod 47. While any suitable means may be provided for driving the control rod between the position shown in FIG. 1 and the position shown in FIG. 2, a solenoid 48 is illustrated which includes a plunger 49 operating in a coil 50. A plunger spring 51 normally biases the plunger to the de-energized position as shown in FIG. 2. A pilot valve spring 52 is provided to normally urge the poppets to the position shown in FIG. 2.

First and second check valves 55 and 56 complete the pneumatic circuitry. The inlet to the check valve 55 is connected through a duct 57 to the pressure ahead of the opening 30 in the valve while the inlet to the check valve 56 is connected through a duct 58 to the pressure at the outlet 12 of the valve. Thus, check valve 55 opens in response to the inlet or upstream pressure if it is the highest, while check valve 56 opens in response to the outlet or downstream pressure if it is the highest. The outlets of the check valves 55 and 56 are connected in common through a common line or duct 59 and additionally to the chamber 37 of the pilot valve 35 through a duct 60. The chamber 38 in the pilot valve is connected through a duct 61 and a passageway 62 in the guide rod 13 to the pressure chamber 24. The chamber 39 of the pilot valve is connected to ambient through vent 62.

During normal air flow operation air will flow between the inlet and the outlet. The moving piston and sleeve assembly is spring loaded into closed direction by return spring 26 under no air flow conditions when the pressure in both pressure chambers is equal. Pressure chamber 25 is always connected to the normal inlet pressure by means of the pressure port 27 in sleeve 19. When the pilot valve is open as shown in FIG. 2, pressure chamber 24 is connected to ambient.

As the inlet pressure is increased from zero, air will commence to flow through the check valve 55 and the pressure port 27 and the pressure in the chamber 25 will increase, thereby reacting upon the effective piston area between the chambers and overcome the return spring force of spring 26 and move the sleeve to open the valve as shown in FIG. 2. A continual increase in inlet pressure will continue to move the valve to fully open position, and also pressurize the ducts or passageways 59 and 60 and chamber 37 of the pilot valve to maintain check valve 56 closed and also assist in maintaining poppet 45 seated. Thereafter, when the pilot valve is maintained open to ambient as seen in FIG. 2, the sleeve 19 will remain in valve full open position as long as the inlet pressure continues or is increased.

When the pilot valve 35 is closed to ambient as seen in FIG. 1, pressure chamber 24 is then isolated from ambient pressure and then opened directly to the inlet pressure of the valve as the air pressure flows through duct 57, check valve 55, duct 60 into the pilot valve chamber 37, into the pilot valve chamber 38 back through duct 61, passageway 62 and into the pressure chamber 24. At this point it should be appreciated that the inlet pressure is higher than the outlet pressure at the outlet 12. This will cause the pressure in chambers 24 and 25 to equalize, thereby eliminating the pressure force load acting upon the sleeve effective area between the chambers and permitting the sleeve return spring 26 to move the sleeve to the valve full shut position as shown in FIG. 1 regardless of the inlet pressure. During this time when the pilot valve is closed to ambient, the check valve 56 will remain shut and permit no air flow to the outlet side of the valve.

In the event of a duct pressure reversal during normal operation when the valve is open as shown in FIG. 2, the valve may be closed upon command to the pilot valve by causing the poppets to shift to the position shown in FIG. 1. In this instance the pressure at the outlet 12 will exceed that at the inlet. With the pilot valve closed to ambient and pressure at the outlet greater than at the inlet, air will flow through the duct 58, the check valve 56, the common duct 59, the duct 60, into chamber 37 of the pilot valve and then into chamber 38 back down through the duct 61 into passageway 62 and into the pressure chamber 24 of the valve. The pressure in chamber 24 will then thereafter increase to equal or exceed the pressure in pressure chamber 25 and react upon the effective sleeve area between the chambers to provide a resultant pressure force that will aid the sleeve return spring 26 to move the sleeve to shut the valve. During this time the check valve 55 will remain closed and permit no air flow to the inlet side of the valve. It can be appreciated that pressurization of chamber 24 through the pneumatic connections insures positive shutoff in the event of duct pressure reversal.

It will be understood that modifications and variations may be effected without departing from the scope of the novel concepts of the present invention, but it is understood that this application is to be limited only by the scope of the appended claims.

The invention is hereby claimed as follows:

1. An inline sleeve valve comprising a tubular body having an inlet and an outlet axially aligned therewith, an axially extending guide rod supported between the inlet and outlet, first and second spaced annular walls on said guide rod, the second annular wall being nearest the outlet and defining with the body an opening, a piston member slidably mounted on said guide rod, first and second sleeves extending from said piston member and coacting with said first and second walls to define first and second pressure chambers, a pressure port in said second sleeve continually communicating the second pressure chamber to the inlet pressure side of the valve, a seat adjacent the outlet coacting with said second wall to define an opening between said inlet and outlet and coacting with said second sleeve wherein the opening is closed upon bottoming of the second sleeve on the seat, spring means in said first chamber continually biasing said piston member and second sleeve toward closed position, a pilot valve including first, second and third chambers, a first port between said first and second chambers and a second port between said second and third chambers, a control member having poppets and movable to either close said first port and open said second port or open said first port and close said second port, means for driving said control member, first and second check valves having their inlets respectively connected to the pressures upstream and downstream from the seat and their outlets connected in common and to the first chamber of said pilot valve, means connecting the second chamber of the pilot valve to said first pressure chamber, and means connecting said third chamber to ambient.

2. An inline valve comprising a tubular body having an inlet and an outlet axially aligned therewith, a piston member and closure assembly in the body defining therewith an air flow path between the inlet and outlet, said assembly including an axially extending guide rod supported between the inlet and outlet, first and second spaced annular walls on said guide rod, the second annular wall being nearest the outlet and defining with the body an opening, a piston member slidably mounted on said guide rod, first and second sleeves extending from said piston member and coacting with said first and second walls to define first and second pressure chambers, a pressure port in said second sleeve continually communicating with second pressure chamber to inlet pressure, a seat adjacent the outlet coacting with said second wall to define an opening between said inlet and outlet and coacting with said second sleeve wherein the opening is closed upon bottoming of the second sleeve on the seat, and spring means in said first chamber continually biasing said piston member and second sleeve toward closed position, and control means for selectively connecting said first pressure chamber to ambient and cause the second sleeve to move to open position or to the higher pressure of the inlet or outlet and cause the second sleeve to move to closed position, said control means including a first check valve having its inlet connected to the inlet pressure side of the valve, a second check valve having its inlet connected to the outlet pressure side of the valve, means connecting the outlets of said check valves in common, and valve means connected to the outlets of the check valves, the first pressure chamber, and ambient for connecting the first chamber to ambient or the outlets of said check valves.

* * * * *